US012764384B2

(12) United States Patent
Kim et al.

(10) Patent No.: US 12,764,384 B2
(45) Date of Patent: Oct. 13, 2026

(54) MOBILITY CONTROL APPARATUS AND METHOD

(71) Applicants: HYUNDAI MOTOR COMPANY, Seoul (KR); KIA CORPORATION, Seoul (KR)

(72) Inventors: Seung Hyun Kim, Hwaseong-si (KR); Tae Ho Lee, Hwaseong-si (KR); Yu Seok Jang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/094,253

(22) Filed: Mar. 28, 2025

(65) Prior Publication Data

US 2026/0095626 A1 Apr. 2, 2026

(30) Foreign Application Priority Data

Sep. 27, 2024 (KR) ........................ 10-2024-0131877

(51) Int. Cl.

| | |
|---|---|
| ***H04N 21/45*** | (2011.01) |
| ***G01C 21/36*** | (2006.01) |
| ***H04N 21/414*** | (2011.01) |

(52) U.S. Cl.

CPC ..... *H04N 21/4524* (2013.01); *G01C 21/3697* (2013.01); *H04N 21/41422* (2013.01)

(58) Field of Classification Search

None

See application file for complete search history.

(56) References Cited

U.S. PATENT DOCUMENTS

| | | | | |
|---|---|---|---|---|
| 10,123,078 | B1 * | 11/2018 | McCarty | H04N 21/4583 |
| 2008/0020702 | A1 * | 1/2008 | Jendbro | H03J 1/0075 455/12.1 |
| 2009/0037097 | A1 * | 2/2009 | Cho | H04N 21/4786 375/316 |
| 2010/0199341 | A1 * | 8/2010 | Foti | H04N 21/6187 726/9 |
| 2013/0347021 | A1 * | 12/2013 | Joong | H04L 67/52 725/109 |
| 2014/0012978 | A1 * | 1/2014 | Moussavian | H04N 21/44213 709/224 |
| 2017/0215163 | A1 * | 7/2017 | Osterwise | H04W 60/04 |
| 2022/0303637 | A1 * | 9/2022 | Venugopal | H04N 21/44209 |

* cited by examiner

*Primary Examiner* — Alexander Q Huerta

(74) *Attorney, Agent, or Firm* — Lempia Summerfield Katz LLC

(57) ABSTRACT

A mobility control apparatus includes a communication circuit and a processor. The processor determines at least one of a first country of a first location, a second country of a second location, a third country in a first route along which a mobility device moves from the first location to the second location, or any combination thereof. The processor receives respective terms associated with providing media content in at least one of the first country, the second country, the third country, or any combination thereof from a server. The processor determines whether to receive an agreement for all the respective terms, based on at least some of the respective terms not being the same as each other. The processor provides the media content, regardless of whether the mobility device enters at least one of the second country, the third country, or any combination thereof.

20 Claims, 10 Drawing Sheets

MOBILITY CONTROL APPARATUS AND METHOD

CROSS-REFERENCE TO RELATED APPLICATION

This application claims the benefit of and priority to Korean Patent Application No. 10-2024-0131877, filed in the Korean Intellectual Property Office on Sep. 27, 2024, the entire contents of which are incorporated herein by reference.

TECHNICAL FIELD

The present disclosure relates to a mobility control apparatus and a method thereof, and more particularly, the present disclosure relates to technologies of providing media content.

BACKGROUND

Recently, various components for providing infotainment have been included in a mobility (e.g., a mobility device or apparatus, such as a vehicle) with free movement. If the mobility device provides the infotainment, there may be a need to agree to terms of use of Web OS, which is a content operating platform. The terms of use of the Web OS, which is the content operating platform, in one country may be the same as or different from the terms of use of the Web OS in other countries.

Thus, if the mobility device crosses a border and enters another country, as a pop-up associated with the terms of use is displayed, there may occur a case in which an agreement on the use agreement is requested from a user.

If the mobility device enters another country and if the pop-up associated with the terms of use is displayed, content which is being provided through the mobility device may pause or end. This may be a factor, which hinders a user experience. The subject matter described in this background section is intended to promote an understanding of the background of the disclosure and thus may include subject matter that is not already known to those of ordinary skill in the art.

SUMMARY

The present disclosure has been made to solve the above-mentioned problems occurring in the prior art while advantages achieved by the prior art are maintained intact.

An aspect of the present disclosure provides a mobility control apparatus and a method for previously receiving an agreement for terms associated with providing media content, before a mobility device initiates to drive, using a route along which the mobility device will operate or move.

Another aspect of the present disclosure provides a mobility control apparatus and a method for seamlessly providing media content, while a mobility device is moving, if a country where the mobility device initiates to operate or move and a country where the operation or movement of the mobility device will end are different from each other.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a mobility control apparatus may include a communication circuit and a processor. The processor may determine at least one of a first country of a first location, a second country of a second location, a third country different from the first country and the second country in a first route along which a mobility device moves from the first location to the second location, or any combination thereof, based on obtaining the first route. The processor may receive respective terms associated with providing media content in at least one of the first country, the second country, the third country, or any combination thereof from a server, based on transmitting a list of countries including the at least one of the first country, the second country, the third country, or any combination thereof to the server. The processor may determine whether to receive an agreement for all the respective terms, when at least some of the respective terms are not the same as each other. The processor may provide the media content, regardless of whether the mobility device enters at least one of the second country, the third country, or any combination thereof, based on receiving the agreement for all the respective terms.

In an embodiment, the respective terms may include first terms associated with providing the media content in the first country, second terms associated with providing the media content in the second country, and third terms associated with providing the media content in the third country. The processor may provide the media content without receiving the agreement, when the second terms and the third terms except for the first terms are the same as each other.

In an embodiment, the processor may provide the media content in only the first country, when not receiving an agreement for the at least some of the respective terms.

The mobility control apparatus according to an embodiment may further include a display. The processor may provide terms associated with providing the media content in the at least one of the second country, the third country, or the any combination thereof, through the display, when a location of the mobility device is within a designated distance from the at least one of the second country, the third country, or the any combination thereof, before the mobility device enters the at least one of the second country, the third country, or the any combination thereof.

In an embodiment, the processor may determine whether there is a fourth country different from the first country, the second country, and the third country in a second route different from the first route, based on the first route changing to the second route, while the mobility device is moving from the first location to the second location along the first route.

In an embodiment, the processor may determine whether respective terms associated with providing the media content in at least one of the first country, the second country, the third country, the fourth country, or any combination thereof are the same as each other, when there is the fourth country in the second route. The processor may determine whether to receive an agreement for fourth terms associated with providing the media content in the fourth country, when the fourth terms are not the same as the respective terms. The processor may provide the media content, regardless of whether the mobility device enters the fourth country, based on receiving the agreement for the fourth terms.

In an embodiment, the processor may maintain providing the media content, when the fourth country is not in the second route.

In an embodiment, the processor may determine whether to obtain a third route along which the mobility device moves from a third location different from the first location to the second location, based on a state of the mobility device changing from ignition (Ig)-on state to a state different from the Ig-on state and changes from the different state to the Ig-on state or a connection of a network between the mobility device and the server being released and reconnected, while the mobility device is moving from the first location to the second location along the first route. The processor may determine whether there is a fifth country different from the first country, the second country, and the third country in the third route. The processor may determine whether fifth terms associated with providing the media content in the fifth country are the same as the respective terms, when there is the fifth country. The processor may determine whether to receive an agreement for the fifth terms, when the fifth terms are not the same as the respective terms. The processor may provide the media content, regardless of whether the mobility device enters the fifth country, based on receiving the agreement for the fifth terms.

The mobility control apparatus according to an embodiment may further include a display. The processor may provide a user of the mobility device with a screen associated with whether to receive the agreement, through the display. The processor may obtain an input associated with whether to receive the agreement from the user who receives the screen.

In an embodiment, the server may include at least one of a first server for providing media content in the first country, a second server for providing the media content in the second country, a third server for providing the media content in the third country, or any combination thereof. Alternatively, the processor may include an integrated server for providing the media content in the first country, the second country, and the third country.

In an embodiment, the processor may determine whether to receive the agreement, before the mobility device initiates to drive, based on the mobility device changing to an Ig-on state.

According to another aspect of the present disclosure, a mobility control system may include a mobility control apparatus and a server. The mobility control apparatus may determine whether a plurality of countries is included in a first route along which a mobility device moves from a first location to a second location, based on obtaining the first route. The mobility control apparatus may receive respective terms associated with providing media content in the plurality of countries from the server, based on the plurality of countries being included in the first route. The mobility control apparatus may transmit a list of countries including the plurality of countries to the server, based on determining to receive an agreement for the respective terms. The server may transmit the respective terms associated with providing the media content in the plurality of countries included in the list to the mobility control apparatus, based on receiving the list. The server may provide the media content by the mobility control apparatus, based on receiving information indicating an agreement on the respective terms from the mobility control apparatus.

In an embodiment, the server may include a plurality of terms associated with providing the media content in all countries including the plurality of countries. The server may transmit the respective terms corresponding to the plurality of terms among the plurality of terms to the mobility control apparatus, based on determining the respective terms.

According to another aspect of the present disclosure, a mobility control method may include determining, by a processor, at least one of a first country of a first location, a second country of a second location, a third country different from the first country and the second country in a first route along which a mobility device moves from the first location to the second location, or any combination thereof, based on obtaining the first route. The mobility control method may include receiving, by the processor, respective terms associated with providing media content in at least one of the first country, the second country, the third country, or any combination thereof from a server, based on transmitting a list of countries including the at least one of the first country, the second country, the third country, or the any combination thereof to the server. The mobility control method may include determining, by the processor, whether to receive an agreement for all the respective terms, when at least some of the respective terms are not the same as each other. The mobility control method may include providing, by the processor, the media content, regardless of whether the mobility device enters at least one of the second country, the third country, or any combination thereof, based on receiving the agreement for all the respective terms.

In an embodiment, the respective terms may include first terms associated with providing the media content in the first country, second terms associated with providing the media content in the second country, and third terms associated with providing the media content in the third country. The mobility control method may further include providing the media content without receiving the agreement, when the second terms and the third terms except for the first terms are the same as each other.

The mobility control method according to an embodiment may further include providing terms associated with providing the media content in the at least one of the second country, the third country, or the any combination thereof, through a display, when a location of the mobility device is within a designated distance from the at least one of the second country, the third country, or the any combination thereof, before the mobility device enters the at least one of the second country, the third country, or the any combination thereof.

The mobility control method according to an embodiment may further include determining whether there is a fourth country different from the first country, the second country, and the third country in a second route different from the first route, based on the first route changing to the second route, while the mobility device is moving from the first location to the second location along the first route.

The mobility control method according to an embodiment may further include determining whether respective terms associated with providing the media content in at least one of the first country, the second country, the third country, the fourth country, or any combination thereof are the same as each other, when there is the fourth country in the second route. The mobility control method may include determining whether to receive an agreement for fourth terms associated with providing the media content in the fourth country, when the fourth terms are not the same as the respective terms. The mobility control method may include providing the media content, regardless of whether the mobility device enters the fourth country, based on receiving the agreement for the fourth terms.

The mobility control method according to an embodiment may further include maintaining providing the media content, when the fourth country is not in the second route.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
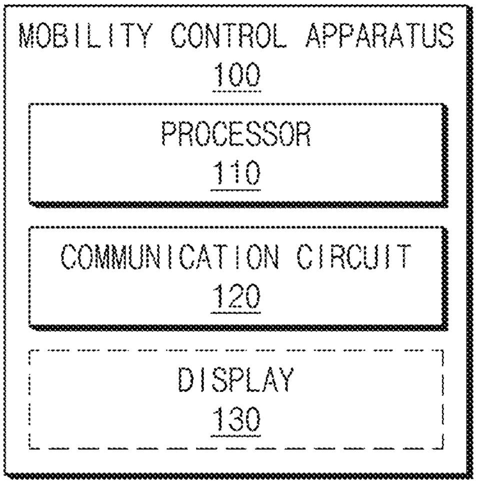
FIG. 1 illustrates an example of a block diagram associated with a mobility control apparatus according to an embodiment of the present disclosure.

Hereinafter, embodiments of the present disclosure are described in detail with reference to the drawings. In adding the reference numerals to the components of each drawing, it should be noted that the identical or equivalent components are designated by the identical numerals even when the components are displayed on other drawings. In addition, a detailed description of well-known features or functions has been omitted in order not to unnecessarily obscure the gist of the present disclosure.

In describing components of embodiments of the present disclosure, the terms first, second, A, B, (a), (b), and the like may be used herein. These terms are only used to distinguish one component from another component and do not limit the corresponding components irrespective of the order or priority of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary should be interpreted as having meanings equal to the contextual meanings in the relevant field of art. The terms should not be interpreted as having ideal or excessively formal meanings unless clearly defined as having such in the present disclosure. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

Hereinafter, embodiments of the present disclosure are described in detail with reference to FIGS. 1-10.

FIG. 1 illustrates an example of a block diagram associated with a mobility control apparatus according to an embodiment of the present disclosure.

Referring to FIG. 1, a mobility control apparatus 100 according to an embodiment of the present disclosure may be implemented inside or outside a mobility, a mobility device, or a mobility apparatus, and some of the components included in the mobility control apparatus 100 may be implemented inside or outside the mobility, the mobility device, or the mobility apparatus. In this case, the mobility control apparatus 100 may be integrally configured with control units in the mobility, the mobility device, or the mobility apparatus or may be implemented as a separate device to be connected to the control units of the mobility, the mobility device, or the mobility apparatus by a separate connection means. For example, the mobility control apparatus 100 may further include components, which are not shown in FIG. 1.

For example, the mobility, the mobility device, or the mobility apparatus may include a transportation device or apparatus. For example, the mobility, the mobility device, or the mobility apparatus may include at least one of a vehicle, a motorcycle, a bicycle, an electric bicycle, an electric kickboard, a drone, a train, a maglev train, a subway, a tram, an urban air mobility (UAM) device, or any combination thereof. However, an embodiment of the present disclosure is not limited to those described above.

Referring to FIG. 1, the mobility control apparatus 100 according to an embodiment may include a processor 110 and a communication circuit 120. According to an embodiment, the mobility control apparatus 100 may further include a display 130. The processor 110, the communication circuit 120, or the display 130 may be electronically or operably coupled to each other by an electronical component including a communication bus.

Hereinafter, that pieces of hardware are operably coupled to each other may include that a direct connection or an indirect connection between the pieces of hardware is established wired and/or wirelessly, such that second hardware is controlled by first hardware among the pieces of hardware.

The different blocks are illustrated, but an embodiment is not limited thereto. For example, some of the pieces of hardware of FIG. 1 may be included in a single integrated circuit including a system on a chip (SoC). Types of the pieces of hardware included in the mobility control apparatus 100 and/or the number of the pieces of hardware are/is not limited to those shown in FIG. 1. For example, the mobility control apparatus 100 may include only some of the pieces of hardware shown in FIG. 1.

The mobility control apparatus 100 according to an embodiment may include hardware for processing data based on one or more instructions. The hardware for processing the data may include the processor 110. For example, the hardware for processing the data may include an arithmetic and logic unit (ALU), a floating point unit (FPU), a field programmable gate array (FPGA), a central processing unit (CPU), and/or an application processor (AP). The processor 110 may have a structure of a single-core processor or may have a structure of a multi-core processor including a dual core, a quad core, a hexa core, or an octa core.

The communication circuit 120 of the mobility control apparatus 100 according to an embodiment may include a hardware component for supporting transmission or reception of a signal between the mobility control apparatus 100 and an external electronic device. For example, the communication circuit 120 may include at least one of a modem, an antenna, an optic/electronic (O/E) converter, or any combination thereof.

For example, the communication circuit 120 may support transmission and or reception of a signal based on various types of protocols including at least one of an Ethernet, a local area network (LAN), a wide area network (WAN), wireless-fidelity (Wi-Fi), Bluetooth, Bluetooth low energy (BLE), ZigBee, long term evolution (LTE), or any combination thereof. Examples of the various types of protocols are not limited to those described above.

The display 130 of the mobility control apparatus 100 according to an embodiment may provide a user with visualized information. For example, the display 130 may be controlled by at least one of the processor 110, a graphic processing unit (GPU), or any combination thereof to output the visualized information.

For example, the display 130 may include at least one of a flat panel display (FPD), an electronic paper, or any combination thereof. The FPD may include at least one of a liquid crystal display (LCD), a plasma display panel (PDP), a digital mirror device (DMD), one or more light emitting diodes (LEDs), a micro-LED, a flexible display, or any combination thereof. The LED may include an organic LED (OLED). However, an embodiment of the present disclosure is not limited to those described above.

According to an embodiment, the processor 110 of the mobility control apparatus 100 may identify a location of the mobility device. For example, the processor 110 may identify the location of the mobility device, using a global positioning system (GPS) sensor included in the mobility device.

In an embodiment, the processor 110 may obtain a first route along which the mobility device operates (e.g., moves) from a first location to a second location. For example, the processor 110 may obtain the first route along which the mobility device operates from the first location corresponding to a starting point to the second location corresponding to a destination, by means of a navigation system.

For example, the processor 110 may identify at least one of a first country of the first location, a second country of the second location, a third country different from the first country and the second country in the first route, or any combination thereof, based on (e.g., when) obtaining the first route along which the mobility device operates from the first location to the second location.

In an embodiment, the processor 110 may transmit a list of countries including at least one of the first country, the second country, the third country, or any combination thereof to a server (e.g., the external electronic device).

For example, the processor 110 may determine or identify whether respective terms associated with providing media content in at least one of the first country, the second country, the third country, or any combination thereof are the same as each other.

For example, the processor 110 may determine whether respective terms associated with providing media content in the first country, the second country, and the third country are the same as each other.

According to an embodiment, the processor 110 may determine whether terms associated with providing media content in the second country and the third country, except for terms in the first country including the current first location of the mobility device, are the same as each other.

For example, the respective terms may include first terms associated with providing the media content in the first country, second terms associated with providing the media content in the second country, and third terms associated with providing the media content in the third country. For example, if the second terms and the third terms except for the first terms are the same as each other, the processor 110 may fail to determine whether to receive agreement (e.g., the processor 110 may provide the media content without receiving the agreement).

For example, the server may include at least one of a first server for providing the media content in the first country, a second server for providing the media content in the second country, a third server for providing the media content in the third country, or any combination thereof. For example, the server may include an integrated server for providing the media content in the first country, the second country, and the third country.

For example, the processor 110 may determine whether to receive an agreement, before the mobility device initiates to drive, based on (i.e., when) the mobility device changing to an ignition (Ig)-on state.

In an embodiment, if at least some of the respective terms associated with providing the media content in at least one of the first country, the second country, the third country, or any combination thereof are not the same as each other, the processor 110 may determine whether to receive an agreement for all the respective terms.

For example, if all the respective terms are the same as each other, the processor 110 may fail to determine whether to receive the agreement. For example, if all the respective terms are the same as each other, the processor 110 may fail to determine whether to receive the agreement and may provide the media content (e.g., the processor 110 may provide the media content without receiving the agreement).

For example, the processor 110 may display a screen for requesting (i.e., transmitting a request message) whether to receive the agreement for all the respective terms, on the display 130. For example, while displaying the screen for requesting whether to receive the agreement for all the terms on the display 130, the processor 110 may obtain an input associated with whether to receive the agreement from the user.

For example, the processor 110 may request terms for providing media content in each of a plurality of countries included in the first route from the server. The processor 110 may receive terms of a country determined to receive an agreement from the server, based on requesting the terms of the country determined to receive the agreement from the server.

For example, when the processor 110 does not receive an agreement for at least some of the respective terms, the processor 110 may provide media content in only the first country. For example, when the processor 110 does not receive the agreement for the at least some of the respective terms, the processor 110 may display a screen for requesting the agreement for the terms on the display 130, before the mobility device enters a country where the agreement is not received.

For example, the processor 110 may provide terms associated with providing the media content in at least one of the second country, the third country, or any combination thereof, through the display 130, based on the location of the mobility device being within a designated distance from the at least one of the second country, the third country, or the any combination thereof, before the mobility device enters the at least one of the second country, the third country, or the any combination thereof.

For example, the processor 110 may provide the user with terms associated with providing the media content in the at least one of the second country, the third country, or any combination thereof, through the display 130, when the mobility device enters the at least one of the second country, the third country, or the any combination thereof.

In an embodiment, the processor 110 may transmit a signal indicating an agreement on all the respective terms to the server.

For example, the processor 110 may display a screen for determining whether to agree to all the respective terms on the display 130. For example, while displaying the screen for determining whether to agree to all the respective terms on the display 130, the processor 110 may receive an input indicating an agreement on all the respective terms by the user.

For example, the processor 110 may transmit a signal indicating an agreement on all the respective terms to the server, based on receiving the input indicating an agreement to all the respective terms by the user.

For example, the processor 110 may provide the media content, regardless of whether the mobility device enters the at least one of the second country, the third country, or the any combination thereof, if the mobility device enters the at least one of the second country, the third country, or any combination thereof, based on transmitting the signal indicating an agreement on all the respective terms to the server.

In an embodiment, while the mobility device is moving from the first location to the second location along the first route, the processor 110 may determine whether the first route to a second route is different from the first route. For example, the processor 110 may determine whether there is a fourth country different from the first country, the second country, and the third country in the second route, based on the first route changing to the second route different from the first route, while the mobility device is moving from the first location to the second location along the first route.

For example, if there is the fourth country in the second route, the processor 110 may determine whether respective terms associated with providing the media content are the same as each other in at least one of the first country, the second country, the third country, the fourth country, or any combination thereof.

For example, if there is the fourth country in the second route, the processor 110 may determine whether respective terms associated with providing the media content in the at least one of the first country, the second country, the third country, the fourth country, or the any combination thereof are the same as each other.

For example, if fourth terms associated with providing media content in the fourth country are not the same as the respective terms of any of the first, second, or third country, the processor 110 may determine whether to receive an agreement for the fourth terms.

For example, if it is determined to receive the agreement for the fourth terms, the processor 110 may provide the media content, regardless of whether the mobility device enters the fourth country, based on receiving the agreement for the fourth terms.

In an embodiment, if there is no fourth country in the second route, the processor 110 may maintain providing the media content.

In an embodiment, the processor 110 may determine whether the state of the mobility device changes from an ignition (Ig)-on state to a state different from the Ig-on state, while the mobility device is moving from the first location to the second location along the first route. For example, the processor 110 may determine whether to obtain a third route along which the mobility device operates from a third location different from the first location to the second location, based on the state of the mobility device changing from the Ig-on state to the state different from the Ig-on state and changing from the different state to the Ig-on state or when a connection of a network between the mobility device and the server is released and reconnected, while the mobility device is moving from the first location to the second location along the first route. For example, the third location may include a location where the state of the mobility device changes from the different state to the Ig-on state. For example, the third location may include a location where the connection of the network between the mobility device and the server is reconnected.

For example, the processor 110 may determine whether there is a fifth country different from the first country, the second country, and the third country in the third route.

For example, if there is the fifth country, the processor 110 may determine whether fifth terms associated with providing the media content in the fifth country are the same as the respective terms of the other countries along the route.

For example, if the fifth terms are not the same as each other, the processor 110 may determine whether to receive an agreement for the fifth terms.

For example, if it is identified to receive the agreement for the fifth terms, the processor 110 may provide the media content, regardless of whether the mobility device enters the fifth country, based on receiving the agreement for the fifth terms.

In an embodiment, the processor 110 may provide the user of the mobility device with the screen associated with whether to receive the agreement, through the display 130. For example, the processor 110 may obtain an input associated with whether to receive the agreement from the user who receives the screen.

As described above, the mobility control apparatus 100 according to an embodiment may previously receive the agreement for the terms associated with providing the media content, before the mobility device initiates to drive. The mobility control apparatus 100 may previously receive the agreement for the terms associated with providing the media content, before the mobility device initiates to drive. Thus, the mobility control apparatus 100 may continuously provide the user with the media content, without asking a question on an intention of the user for the terms when the mobility device crosses a border.

Figure 2:
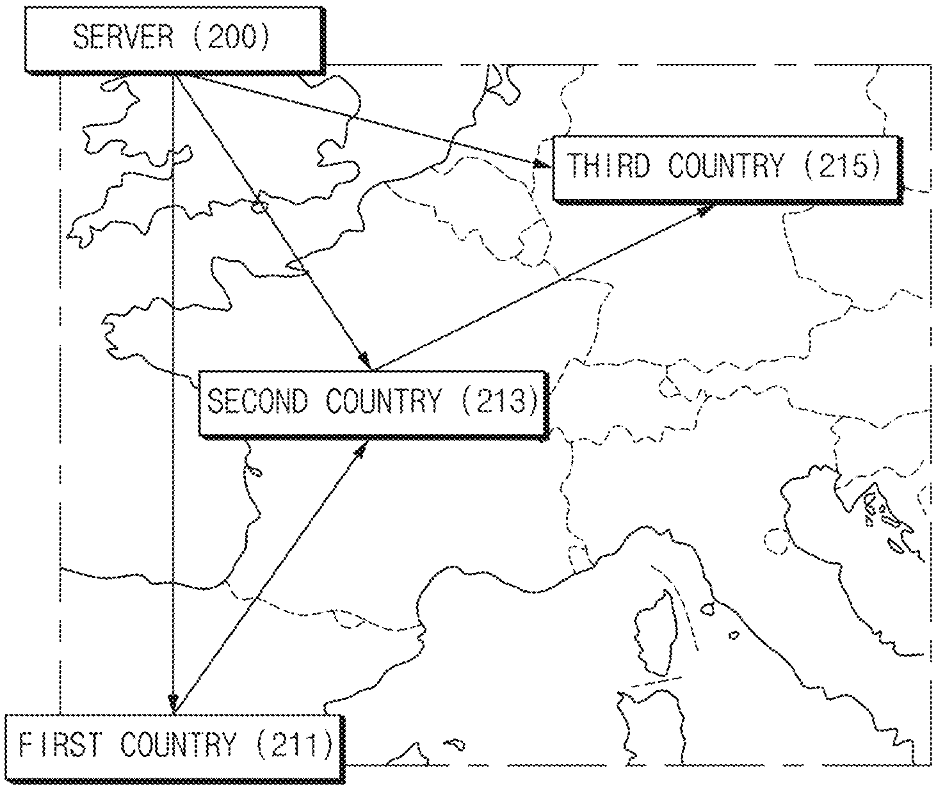
FIG. 2 illustrates an example of transmitting information to a mobility device in a server depending on a country where the mobility device is located, in an embodiment of the present disclosure.

FIG. 2 illustrates an example of transmitting information to a mobility device in a server depending on a country where the mobility device is located, in an embodiment of the present disclosure.

Referring to FIG. 2, in an embodiment, a server 200 may transmit information depending on a location of a mobility control apparatus (e.g., a mobility control apparatus 100 of FIG. 1).

For example, a mobility control system may include the server 200 and the mobility control apparatus.

For example, the server 200 may receive, from the mobility control apparatus, a list of countries included in a route along which the mobility device including the mobility control apparatus will operate.

For example, based on a first route along which the mobility device operates from a first location to a second location, the mobility control apparatus may determine whether a plurality of countries (e.g., a first country 211, a second country 213, and/or a third country 215) is included in the first route.

For example, the mobility control apparatus may receive respective terms associated with providing media content in the plurality of countries from the server 200, based on the plurality of countries being included in the first route.

For example, the mobility control apparatus may transmit a list of countries including the plurality of countries to the server 200, based on whether it is determined to receive the agreement for the respective terms.

In an embodiment, the server 200 may transmit the respective terms associated with providing the media content in the plurality of countries included in the country list to the mobility control apparatus, based on receiving the country list (i.e., in response to receiving the country list).

For example, the server 200 may provide the media content through the mobility control apparatus, in response to receiving information indicating an agreement to the respective terms from the mobility control apparatus.

For example, the server 200 may include a plurality of terms associated with providing media content in all countries including the plurality of countries.

For example, the server 200 may identify the respective terms corresponding to the plurality of countries among the plurality of terms stored in its memory.

For example, the server 200 may transmit the respective terms to the mobility control apparatus, based on identifying the respective terms corresponding to the plurality of countries among the plurality of terms.

Figure 3:
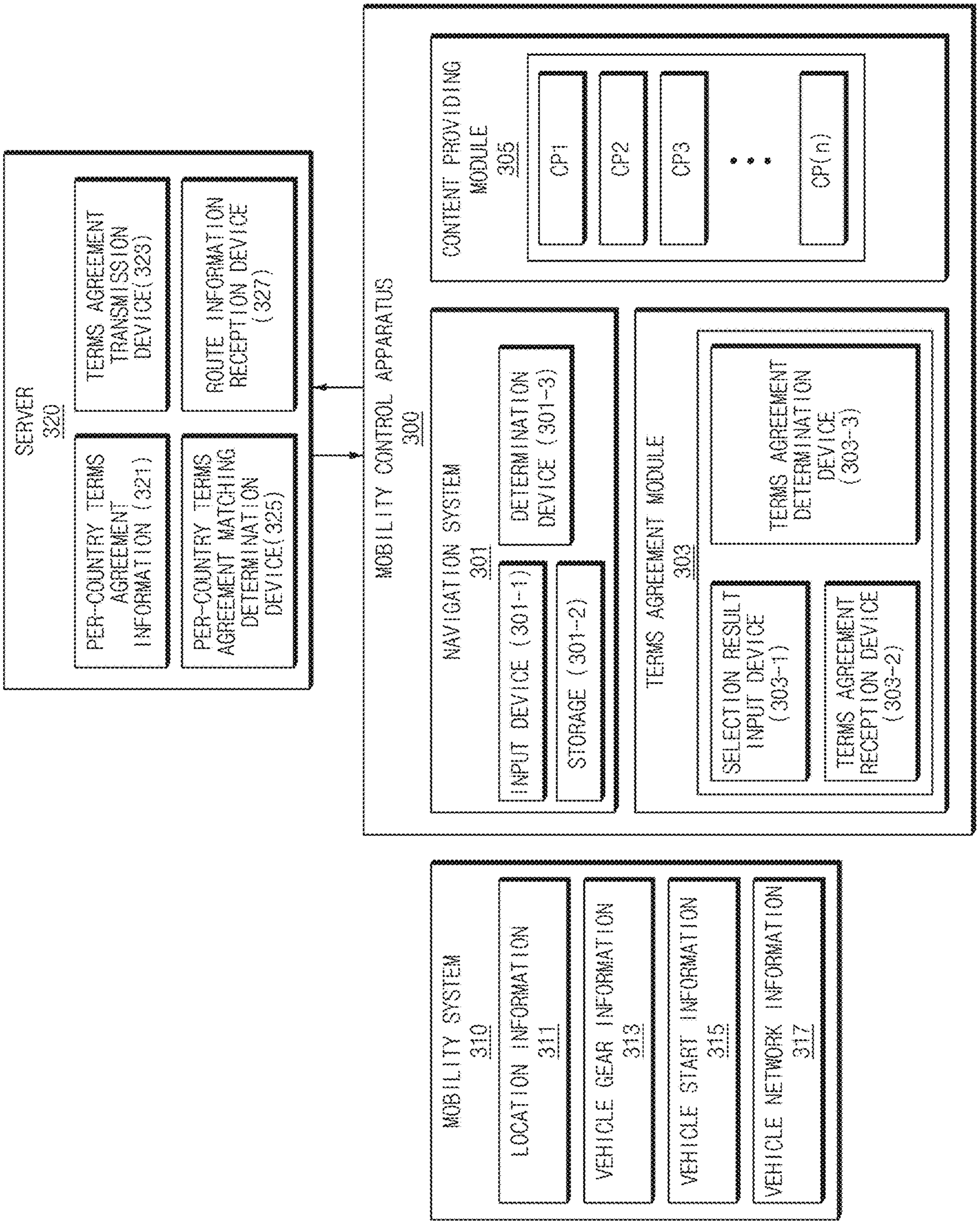
FIG. 3 illustrates an example of a content providing system including a mobility control apparatus according to an embodiment of the present disclosure.

FIG. 3 illustrates an example of a mobility control system including a mobility control apparatus according to an embodiment of the present disclosure.

Referring to FIG. 3, the mobility control system according to an embodiment may include at least one of a mobility control apparatus 300, a mobility system 310, a server 320, or any combination thereof.

For example, the mobility control apparatus 300 may include at least one of a navigation system 301, a terms agreement module 303, a content providing module 305, or any combination thereof.

For example, the navigation system 301 may include at least one of an input device 301-1, storage 301-2, a determination device 301-3, or any combination thereof.

For example, the terms agreement module 303 may include at least one of a selection result input device 303-1, a terms agreement reception device 303-2, a terms agreement determination device 303-3, or any combination thereof.

For example, the content providing module 305 may include at least one of CP1, CP2, CP3, . . . , CP(n), or any combination thereof. For example, the CP may include a communication processor.

In an embodiment, the mobility system 310 may include at least one of location information 311, vehicle gear information 313, vehicle start information 315, vehicle network information 317, or any combination thereof.

For example, the mobility system 310 may transmit the at least one of the location information 311, the vehicle gear information 313, the vehicle start information 315, the vehicle network information 317, or the any combination thereof to the mobility control apparatus 300 by using a mobility network.

For example, the mobility network may include at least one of a controller area network (CAN), an Ethernet, or any combination thereof.

In an embodiment, the server 320 may include at least one of per-country terms agreement information 321, a terms agreement transmission device 323, a per-country terms agreement matching determination device 325, a route information reception device 327, or any combination thereof.

For example, the server 320 may determine terms to be transmitted to the mobility control apparatus 300 by using the per-country terms agreement information 321, in response to receiving a list of countries including a plurality of countries from the mobility control apparatus 300. For example, the server 320 may transmit the determined terms to the mobility control apparatus 300 through the terms agreement transmission device 323.

Figure 4:
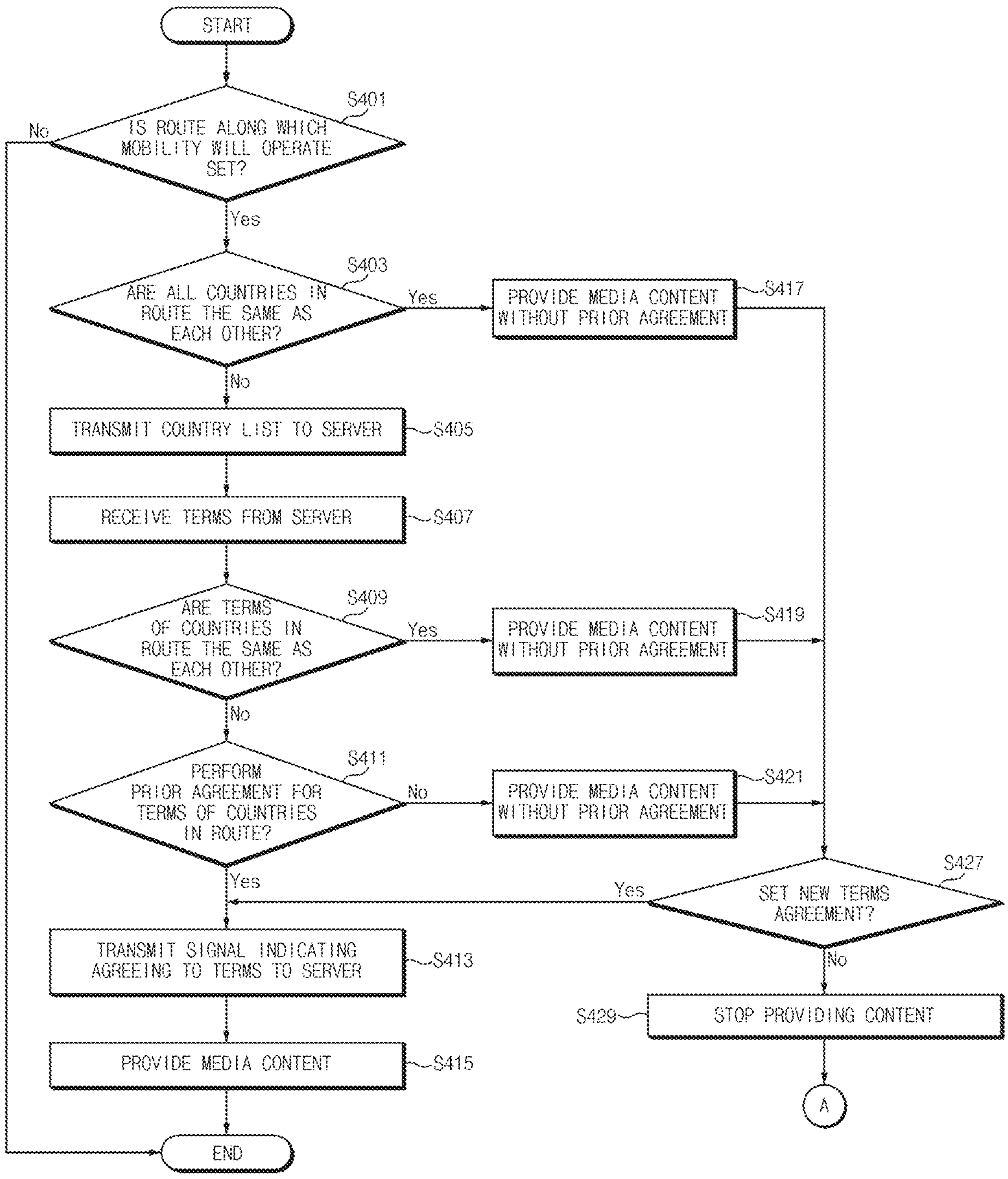
FIG. 4 illustrates an example of a flowchart associated with a mobility control method according to an embodiment of the present disclosure.

FIG. 4 illustrates an example of a flowchart associated with a mobility control method according to an embodiment of the present disclosure.

Hereinafter, it is assumed that a mobility control apparatus 100 of FIG. 1 performs a process of FIG. 4. Furthermore, in the description of FIG. 4, an operation described as being performed by an apparatus may be understood as being controlled by a processor 110 of the mobility control apparatus 100.

At least one of the operations of FIG. 4 may be performed by the mobility control apparatus 100 of FIG. 1. At least one of the operations of FIG. 4 may be controlled by the processor 110 of FIG. 1. The respective operations of FIG. 4 may be sequentially performed but are not necessarily sequentially performed. For example, an order of the respective operations may be changed, and at least two operations may be performed in parallel.

Referring to FIG. 4, in S401, the mobility control method according to an embodiment may include identifying or determining whether a route along which a mobility device will operate is set.

When the route along which the mobility device will operate is set (Yes in S401), in S403, the mobility control method according to an embodiment may include identifying or determining whether all countries in the route are the same as each other.

When the route along which the mobility device will operate is not set (No in S401), the mobility control method according to an embodiment may include ending the process.

When all the countries in the route are not the same as each other (No in S403), in S405, the mobility control method according to an embodiment may include transmitting a country list to a server. For example, the mobility control method may include transmitting the list of countries including countries included in the set route to the server. An embodiment of the present disclosure is not limited to those described above. For example, there may be the case in which all the countries in the route are not the same as each other in the above description. However, an embodiment of the present disclosure may include a case in which at least some of the countries in the route are not the same as each other.

When all the countries in the route are the same as each other (Yes in S403), in S417, the mobility control method according to an embodiment may include providing media content without a prior agreement (i.e., without an acceptance of terms of a prior agreement).

In S407, the mobility control method according to an embodiment may include receiving terms from the server. For example, the mobility control method may include receiving terms required when providing media content, in each of the countries included in the country list transmitted to the server. For example, the mobility control method may include obtaining terms respectively corresponding to the countries included in the country list.

In S409, the mobility control method according to an embodiment may include identifying or determining whether the terms of the countries in the route are the same as each other. For example, the mobility control method may include identifying or determining whether the received terms are the same as each other, based on receiving the terms respectively corresponding to the countries from the server.

When the terms of the countries in the route are not the same as each other (No in S409), in S411, the mobility control method according to an embodiment may include identifying or determining whether to perform prompting of an acceptance of a prior agreement for the terms of the countries in the route.

For example, the mobility control method may include displaying, on a display, a screen representing whether to agree to the terms respectively corresponding to the countries in the route before the mobility device initiates to drive. The mobility control method may include obtaining a user input associated with whether to agree to the terms from the user, based on displaying the screen representing whether to agree before the mobility device initiates to drive.

When the terms of the countries in the route are the same as each other (Yes in S409), in S419, the mobility control method according to an embodiment may include providing the media content without a prior agreement (i.e., without an acceptance of terms of a prior agreement).

When performing the prompting of the acceptance of a prior agreement for the terms of the countries in the route (Yes in S411), in S413, the mobility control method according to an embodiment may include transmitting a signal indicating an agreement to the terms to the server. For example, the mobility control method may include transmitting the signal indicating an agreement on the received terms to the server, before the mobility device initiates to drive.

When not performing the prompting of the acceptance of a prior agreement for the terms of the countries in the route (No in S411), in S421, the mobility control method according to an embodiment may include providing the media content without the prior agreement (i.e., without an acceptance of terms of the prior agreement).

In S427, the mobility control method according to an embodiment may include determining whether to set new terms of an agreement. For example, the mobility control method may include determining whether to set the new terms of the agreement, when the mobility device enters a country requiring an additional terms agreement (i.e., an agreement requiring new terms to be accepted).

when setting the new terms agreement (Yes in S427), in S413, the mobility control method according to an embodiment may include transmitting the signal indicating an agreement on the terms to the server.

When not setting the new terms agreement (No in S427), in S429, the mobility control method according to an embodiment may include stopping providing the content. For example, the mobility control method may include stopping providing the content, based on rejecting the new terms agreement.

In S415, the mobility control method according to an embodiment may include providing the media content. For example, the mobility control method may include providing the media content, based on receiving information used for providing the media content from the server. The information responds to the signal indicating an agreement on the received terms.

Figure 5:
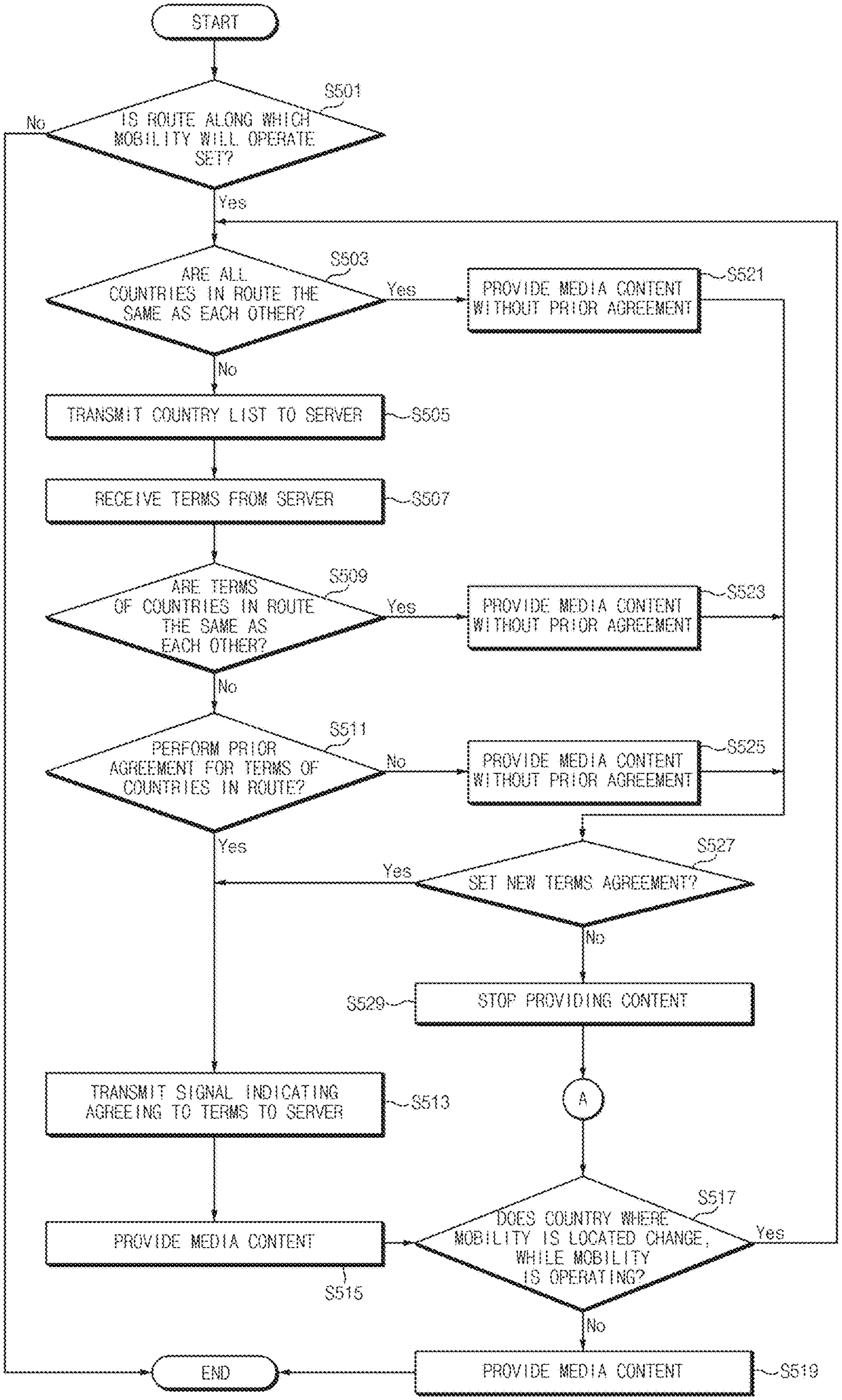
FIG. 5 illustrates an example of a flowchart associated with a mobility control method according to an embodiment of the present disclosure.

FIG. 5 illustrates an example of a flowchart associated with a mobility control method according to an embodiment of the present disclosure.

Hereinafter, it is assumed that a mobility control apparatus 100 of FIG. 1 performs a process of FIG. 5. Furthermore, in the description of FIG. 5, an operation described as being performed by an apparatus may be understood as being controlled by a processor 110 of the mobility control apparatus 100.

At least one of the operations of FIG. 5 may be performed by the mobility control apparatus 100 of FIG. 1. At least one of the operations of FIG. 5 may be controlled by the processor 110 of FIG. 1. The respective operations of FIG. 5 may be sequentially performed but are not necessarily sequentially performed. For example, an order of the respective operations may be changed, and at least two operations may be performed in parallel.

Referring to FIG. 5, in S501, the mobility control method according to an embodiment may include identifying or determining whether a route along which a mobility device will operate is set. S501 may be substantially the same as S401.

When the route along which the mobility device will operate is set (Yes in S501), in S503, the mobility control method according to an embodiment may include identifying or determining whether all countries in the route are the same as each other. S503 may be substantially the same as S403.

When the route along which the mobility device will operate is not set (No in S501), the mobility control method according to an embodiment may include ending the process.

When all the countries in the route are not the same as each other (No in S503), in S505, the mobility control method according to an embodiment may include transmitting a country list to a server. S505 may be substantially the same as S405.

When all the countries in the route are the same as each other (Yes in S503), in S521, the mobility control method according to an embodiment may include providing media content without a prior agreement (i.e., without an acceptance of terms of a prior agreement). S521 may be substantially the same as S417.

In S507, the mobility control method according to an embodiment may include receiving terms from the server. S507 may be substantially the same as S407.

In S509, the mobility control method according to an embodiment may include identifying or determining whether the terms of the countries in the route are the same as each other. S509 may be substantially the same as S409.

When the terms of the countries in the route are not the same as each other (No in S509), in S511, the mobility control method according to an embodiment may include identifying or determining whether to perform prompting of an acceptance of a prior agreement for the terms of the countries in the route. S511 may be substantially the same as S411.

When the terms of the countries in the route are the same as each other (Yes in S509), in S523, the mobility control method according to an embodiment may include providing the media content without a prior agreement (i.e., without an acceptance of terms of a prior agreement). S523 may be substantially the same as S419.

When performing the prompting of the acceptance of a prior agreement for the terms of the countries in the route (Yes in S511), in S513, the mobility control method according to an embodiment may include transmitting a signal indicating an agreement on the terms to the server. S513 may be substantially the same as S413.

When not performing the prompting of the acceptance of a prior agreement for the terms of the countries in the route (No in S511), in S525, the mobility control method according to an embodiment may include providing the media content without a prior agreement (i.e., without an acceptance of terms of the prior agreement). S525 may be substantially the same as S421.

In S527, the mobility control method according to an embodiment may include determining whether to set new terms of an agreement. S527 may be substantially the same as S427 of FIG. 4.

When setting the new terms of the agreement (Yes in S527), in S513, the mobility control method according to an embodiment may include transmitting the signal indicating an agreement to the terms of the new agreement to the server.

When not setting the new terms of the agreement (No in S527), in S529, the mobility control method according to an embodiment may include stopping providing the content. S529 may be substantially the same as S429 of FIG. 4.

In S515, the mobility control method according to an embodiment may include providing the media content. S515 may be substantially the same as S415.

In S517, the mobility control method according to an embodiment may include identifying or determining whether a country where the mobility device is located changes, while the mobility device is operating.

When the country where the mobility device is located changes while the mobility device is operating (Yes in S517), the mobility control method according to an embodiment may include returning to S503 to determine whether all the countries in the route are the same as each other.

When the country where the mobility device is located does not change while the mobility device is operating (No in S517), in S519, the mobility control method according to an embodiment may include providing the media content.

Figure 6:
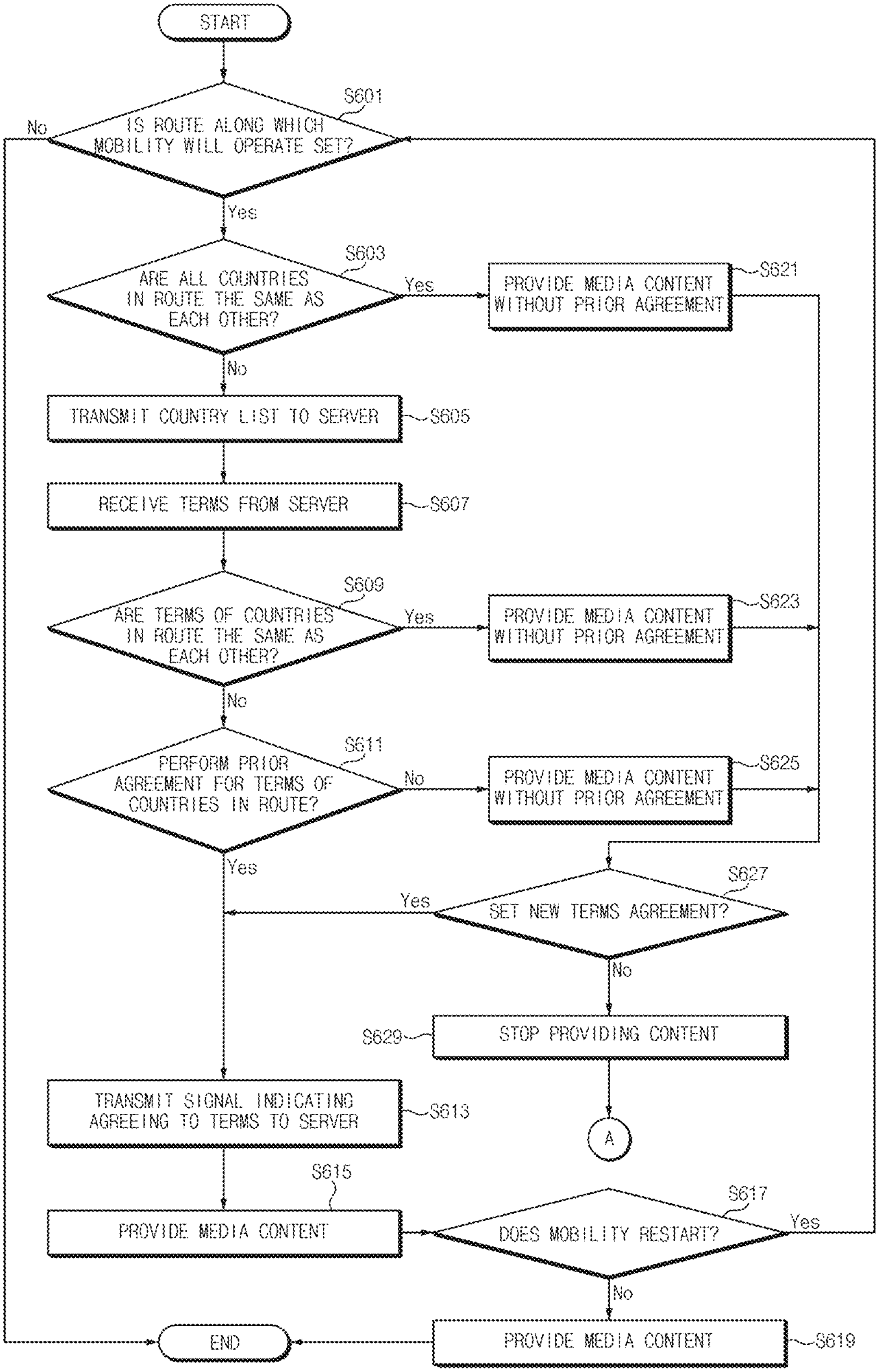
FIG. 6 illustrates an example of a flowchart associated with a mobility control method according to an embodiment of the present disclosure.

FIG. 6 illustrates an example of a flowchart associated with a mobility control method according to an embodiment of the present disclosure.

Hereinafter, it is assumed that a mobility control apparatus 100 of FIG. 1 performs a process of FIG. 6. Furthermore, in the description of FIG. 6, an operation described as being performed by an apparatus may be understood as being controlled by a processor 110 of the mobility control apparatus 100.

At least one of the operations of FIG. 6 may be performed by the mobility control apparatus 100 of FIG. 1. At least one of the operations of FIG. 6 may be controlled by the processor 110 of FIG. 1. The respective operations of FIG. 6 may be sequentially performed but are not necessarily sequentially performed. For example, an order of the respective operations may be changed, and at least two operations may be performed in parallel.

Referring to FIG. 6, in S601, the mobility control method according to an embodiment may include identifying or determining whether a route along which a mobility device will operate is set. S601 may be substantially the same as S401 and/or S501.

When the route along which the mobility device will operate is set (Yes in S601), in S603, the mobility control method according to an embodiment may include identifying or determining whether all countries in the route are the same as each other. S603 may be substantially the same as S403 and/or S503.

When the route along which the mobility device will operate is not set (No in S601), the mobility control method according to an embodiment may include ending the process.

When all the countries in the route are not the same as each other (No in S603), in S605, the mobility control method according to an embodiment may include transmitting a country list to a server. S605 may be substantially the same as S405 and/or S505.

When all the countries in the route are the same as each other (Yes in S603), in S621, the mobility control method according to an embodiment may include providing media content without a prior agreement (i.e., without an acceptance of terms of a prior agreement). S621 may be substantially the same as S417 and/or S521.

In S607, the mobility control method according to an embodiment may include receiving terms from the server. S607 may be substantially the same as S407 and/or S507.

In S609, the mobility control method according to an embodiment may include identifying or determining whether the terms of the countries in the route are the same as each other. S609 may be substantially the same as S409 and/or S509.

When the terms of the countries in the route are not the same as each other (No in S609), in S611, the mobility control method according to an embodiment may include identifying or determining whether to perform prompting of an acceptance of a prior agreement for the terms of the countries in the route. S611 may be substantially the same as S411 and/or S511.

When the terms of the countries in the route are the same as each other (Yes in S609), in S623, the mobility control method according to an embodiment may include providing the media content without a prior agreement (i.e., without acceptance of terms of a prior agreement). S623 may be substantially the same as S419 and/or S523.

When performing the prompting of an acceptance of the prior agreement for the terms of the countries in the route (Yes in S611), in S613, the mobility control method according to an embodiment may include transmitting a signal indicating an agreement on the terms to the server. S613 may be substantially the same as S413 and/or S513.

When not performing the prompting of an acceptance of the prior agreement for the terms of the countries in the route (No in S611), in S625, the mobility control method according to an embodiment may include providing the media content without a prior agreement (i.e., without an acceptance of terms of a prior agreement). S625 may be substantially the same as S421 and/or S525.

In S627, the mobility control method according to an embodiment may include determining whether to set new terms of an agreement. S627 may be substantially the same as S427 of FIG. 4 and/or S527 of FIG. 5.

When setting the new terms of the agreement (Yes in S627), in S613, the mobility control method according to an embodiment may include transmitting the signal indicating an agreement on the new terms to the server.

When not setting the new terms of the agreement (No in S627), in S629, the mobility control method according to an embodiment may include stopping providing the content. S629 may be substantially the same as S429 of FIG. 4 and/or S529 of FIG. 5.

In S615, the mobility control method according to an embodiment may include providing the media content. S615 may be substantially the same as S415 and/or S515.

In S617, the mobility control method according to an embodiment may include identifying or determining whether the mobility device restarts. For example, the restarting may include that the mobility device changes from an Ig-on state to a state (e.g., an Ig-off state) different from the Ig-on state and then changes from the state different from the Ig-on state to the Ig-on state.

When the mobility device restarts (Yes in S617), the mobility control method according to an embodiment may include returning to S601 to determine whether the route along which the mobility will operate is set.

When the mobility device does not restart (No in S617), in S619, the mobility control method according to an embodiment may include providing the media content. S619 may be substantially the same as S519.

Figure 7:
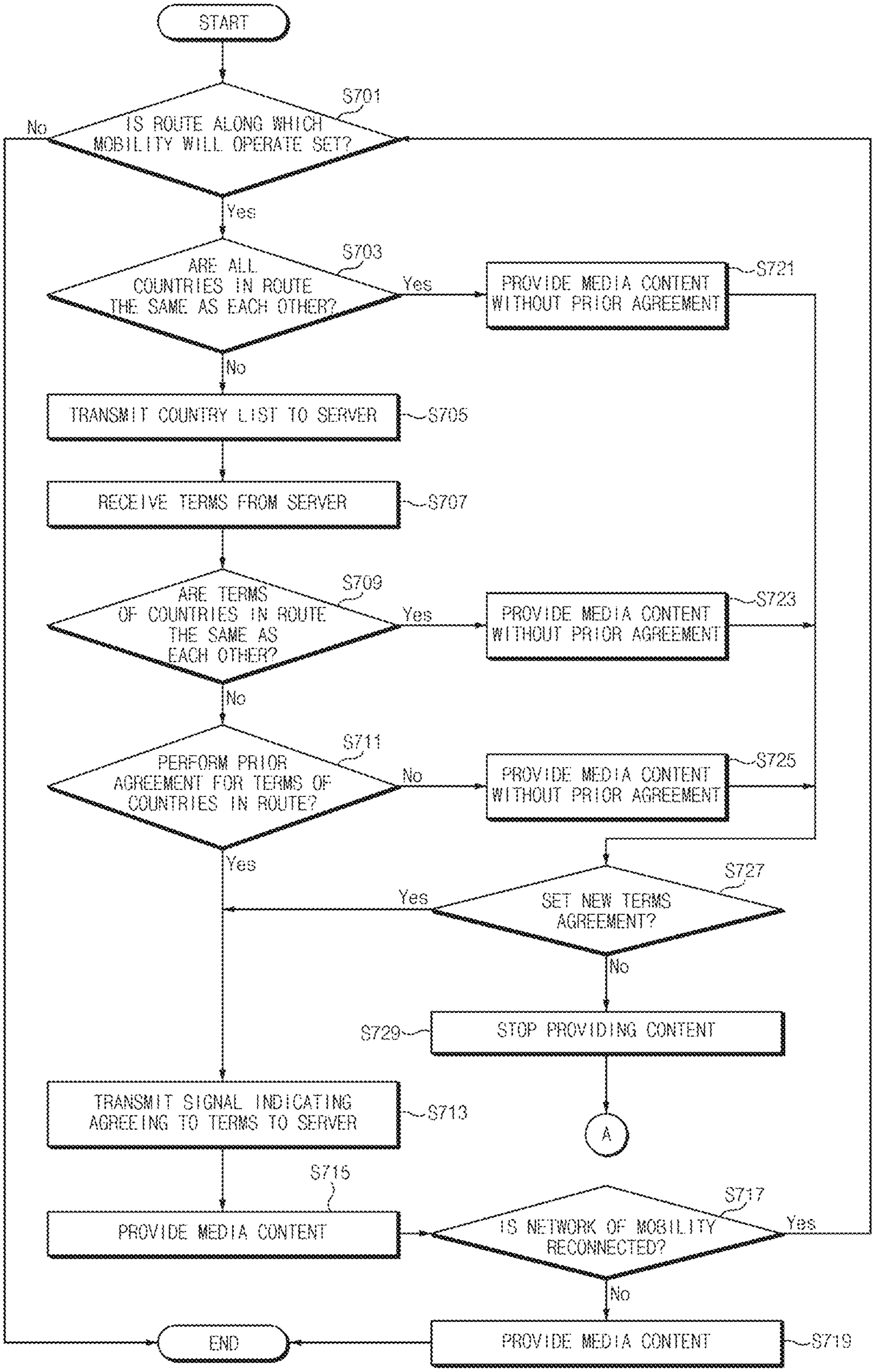
FIG. 7 illustrates an example of a flowchart associated with a mobility control method according to an embodiment of the present disclosure.

FIG. 7 illustrates an example of a flowchart associated with a mobility control method according to an embodiment of the present disclosure.

Hereinafter, it is assumed that a mobility control apparatus 100 of FIG. 1 performs a process of FIG. 7. Furthermore, in the description of FIG. 7, an operation described as being performed by an apparatus may be understood as being controlled by a processor 110 of the mobility control apparatus 100.

At least one of the operations of FIG. 7 may be performed by the mobility control apparatus 100 of FIG. 1. At least one of the operations of FIG. 7 may be controlled by the processor 110 of FIG. 1. The respective operations of FIG. 7 may be sequentially performed but are not necessarily sequentially performed. For example, an order of the respective operations may be changed, and at least two operations may be performed in parallel.

Referring to FIG. 7, in S701, the mobility control method according to an embodiment may include identifying or determining whether a route along which a mobility device will operate is set. S701 may be substantially the same as S401, S501, and/or S601.

When the route along which the mobility device will operate is set (Yes in S701), in S703, the mobility control method according to an embodiment may include identifying or determining whether all countries in the route are the same as each other. S703 may be substantially the same as S403, S503, and/or S603.

When the route along which the mobility device will operate is not set (No in S701), the mobility control method according to an embodiment may include ending the process.

When all the countries in the route are not the same as each other (No in S703), in S705, the mobility control method according to an embodiment may include transmitting a country list to a server. S705 may be substantially the same as S405, S505, and/or S605.

When all the countries in the route are the same as each other (Yes in S703), in S721, the mobility control method according to an embodiment may include providing media content without a prior agreement (i.e., without an acceptance of terms of a prior agreement). S721 may be substantially the same as S417, S521, and/or S621.

In S707, the mobility control method according to an embodiment may include receiving terms from the server. S707 may be substantially the same as S407, S507, and/or S607.

In S709, the mobility control method according to an embodiment may include identifying or determining whether the terms of the countries in the route are the same as each other. S709 may be substantially the same as S409, S509, and/or S609.

When the terms of the countries in the route are not the same as each other (No in S709), in S711, the mobility control method according to an embodiment may include identifying or determining whether to perform prompting of an acceptance of a prior agreement for the terms of the countries in the route. S711 may be substantially the same as S411, S511, and/or S611.

When the terms of the countries in the route are the same as each other (Yes in S709), in S723, the mobility control method according to an embodiment may include providing the media content without a prior agreement (i.e., without an acceptance of terms of a prior agreement). S723 may be substantially the same as S419, S523, and/or S623.

When performing the prompting of an acceptance of a prior agreement for the terms of the countries in the route (Yes in S711), in S713, the mobility control method according to an embodiment may include transmitting a signal indicating an agreement to the terms of the prior agreement to the server. S713 may be substantially the same as S413, S513, and/or S613.

When not performing the prompting of an acceptance of a prior agreement for the terms of the countries in the route (No in S711), in S725, the mobility control method according to an embodiment may include providing the media content without a prior agreement (i.e., without an acceptance of terms of a prior agreement). S725 may be substantially the same as S421, S525, and/or S625.

In S727, the mobility control method according to an embodiment may include determining whether to set new terms of an agreement. S727 may be substantially the same as S427 of FIG. 4, S527 of FIG. 5, and/or S627 of FIG. 6.

When setting the new terms of an agreement (Yes in S727), in S713, the mobility control method according to an embodiment may include transmitting the signal indicating an agreement on the terms of the new agreement to the server.

When not setting the new terms of an agreement (No in S727), in S729, the mobility control method according to an embodiment may include stopping providing the content. S729 may be substantially the same as S429 of FIG. 4, S529 of FIG. 5, and/or S629 of FIG. 6.

In S715, the mobility control method according to an embodiment may include providing the media content. S715 may be substantially the same as S415, S515, and/or S615.

In S717, the mobility control method according to an embodiment may include identifying or determining whether a network of the mobility device is reconnected. For example, the mobility control method may include identifying or determining whether the connection of the network of the mobility device is released and is then reconnected.

When the network of the mobility device is reconnected (Yes in S717), the mobility control method according to an embodiment may include returning to S701 to determine whether the route along which the mobility device will operate is set.

When the network of the mobility device is not reconnected (No in S717), in S719, the mobility control method according to an embodiment may include providing the media content. S719 may be substantially the same as S519 and/or S619.

Figure 8:
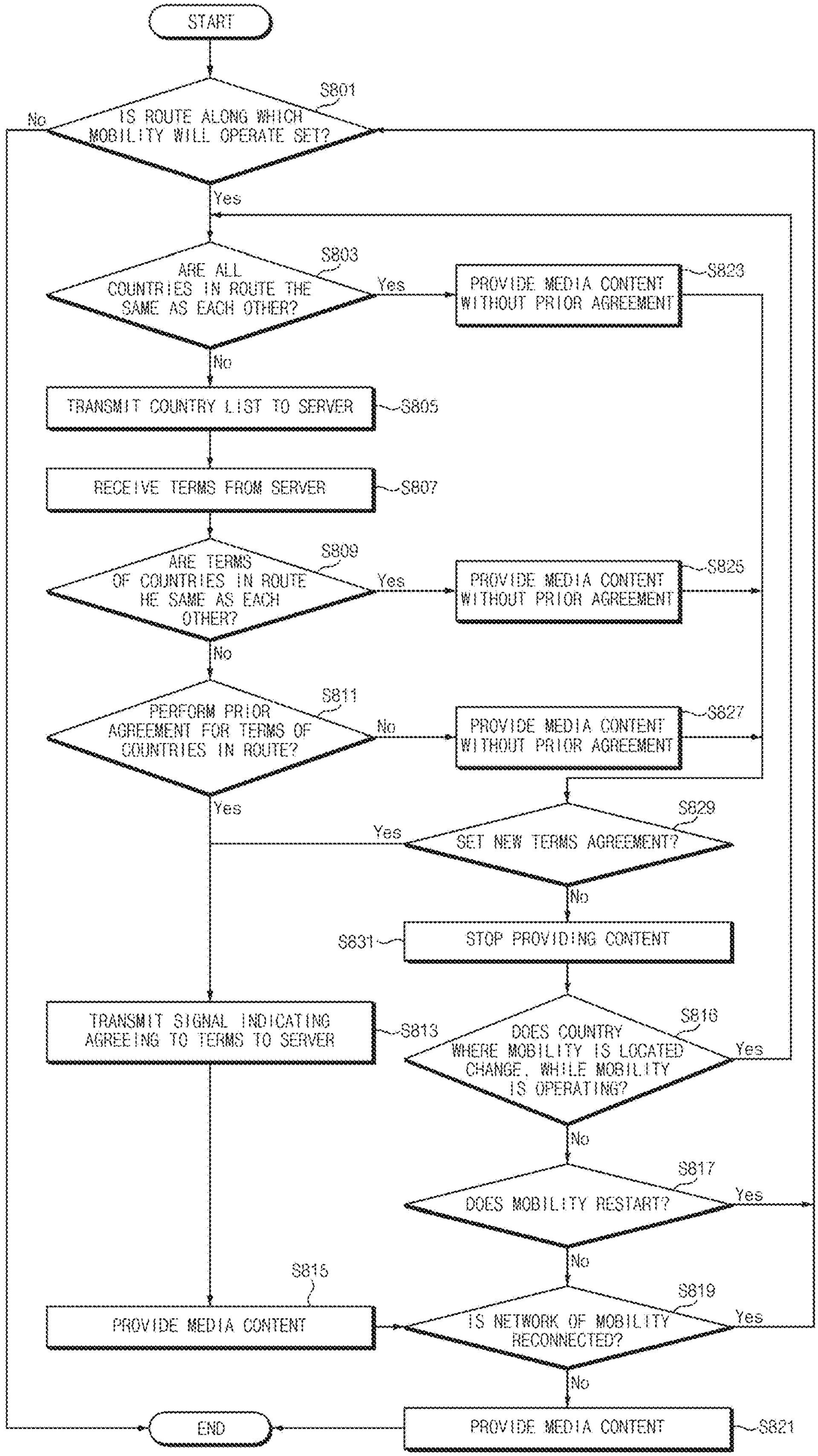
FIG. 8 illustrates an example of a flowchart associated with a mobility control method according to an embodiment of the present disclosure.

FIG. 8 illustrates an example of a flowchart associated with a mobility control method according to an embodiment of the present disclosure.

Hereinafter, it is assumed that a mobility control apparatus 100 of FIG. 1 performs a process of FIG. 8. Furthermore, in the description of FIG. 8, an operation described as being performed by an apparatus may be understood as being controlled by a processor 110 of the mobility control apparatus 100.

At least one of the operations of FIG. 8 may be performed by the mobility control apparatus 100 of FIG. 1. At least one of the operations of FIG. 8 may be controlled by the processor 110 of FIG. 1. The respective operations of FIG. 8 may be sequentially performed but are not necessarily sequentially performed. For example, an order of the respective operations may be changed, and at least two operations may be performed in parallel.

Referring to FIG. 8, in S801, the mobility control method according to an embodiment may include identifying or determining whether a route along which a mobility device will operate is set. S801 may be substantially the same as S401, S501, S601, and/or S701.

When the route along which the mobility device will operate is set (Yes in S801), in S803, the mobility control method according to an embodiment may include identifying or determining whether all countries in the route are the same as each other. S803 may be substantially the same as S403, S503, S603, and/or S703.

When the route along which the mobility device will operate is not set (No in S801), the mobility control method according to an embodiment may include ending the process.

When all the countries in the route are not the same as each other (No in S803), in S805, the mobility control method according to an embodiment may include transmitting a country list to a server. S805 may be substantially the same as S405, S505, S605, and/or S705.

When all the countries in the route are the same as each other (Yes in S803), in S823, the mobility control method according to an embodiment may include providing media content without a prior agreement (i.e., without an acceptance of terms of a prior agreement). S823 may be substantially the same as S417, S521, S621, and/or S721.

In S807, the mobility control method according to an embodiment may include receiving terms from the server. S807 may be substantially the same as S407, S507, S607, and/or S707.

In S809, the mobility control method according to an embodiment may include identifying or determining whether the terms of the countries in the route are the same as each other. S809 may be substantially the same as S409, S509, S609, and/or S709.

When the terms of the countries in the route are not the same as each other (No in S809), in S811, the mobility control method according to an embodiment may include identifying or determining whether to perform a prompt of an acceptance of a prior agreement for the terms of the countries in the route. S811 may be substantially the same as S411, S511, S611, and/or S711.

When the terms of the countries in the route are the same as each other (Yes in S809), in S825, the mobility control method according to an embodiment may include providing the media content without a prior agreement (i.e., without an acceptance of terms of a prior agreement). S825 may be substantially the same as S419, S523, S623, and/or S723.

When performing the prompting of an acceptance of a prior agreement for the terms of the countries in the route (Yes in S811), in S813, the mobility control method according to an embodiment may include transmitting the signal indicating an agreement to the terms to the server. S813 may be substantially the same as S413, S513, S613, and/or S713.

When not performing the prompting of an acceptance of a prior agreement for the terms of the countries in the route (No in S811), in S827, the mobility control method according to an embodiment may include providing the media content without a prior agreement (i.e., without an acceptance of terms of a prior agreement). S827 may be substantially the same as S421, S525, S625, and/or S725.

In S829, the mobility control method according to an embodiment may include determining whether to set new terms of an agreement. S829 may be substantially the same as S427 of FIG. 4, S527 of FIG. 5, S627 of FIG. 6, and/or S727 of FIG. 7.

When setting the new terms of the agreement (Yes in S829), in S813, the mobility control method according to an embodiment may include transmitting a signal indicating an agreement on the terms of the new agreement to the server.

When not setting the new terms of the agreement (No in S829), in S831, the mobility control method according to an embodiment may include stopping providing the content. S831 may be substantially the same as S429 of FIG. 4, S529 of FIG. 5, S629 of FIG. 6, and/or S729 of FIG. 7.

In S815, the mobility control method according to an embodiment may include providing the media content. S815 may be substantially the same as S415, S515, S615, and/or S715.

In S816, the mobility control method according to an embodiment may include identifying or determining whether a country where the mobility device is located changes, while the mobility device is operating. S816 may be substantially the same as S517.

When the country where the mobility device is located changes while the mobility device is operating (Yes in S816), the mobility control method according to an embodiment may include returning to S803 to determine whether all the countries in the route are the same as each other.

When the country where the mobility device is located does not change while the mobility device is operating (No in S816), in S817, the mobility control method according to an embodiment may include identifying or determining whether the mobility device restarts. S817 may be substantially the same as S617.

When the mobility device restarts (Yes in S817), the mobility control method according to an embodiment may include returning to S801 to determine whether the route along which the mobility device will operate is set.

When the mobility device does not restart (No in S817), in S819, the mobility control method according to an embodiment may include identifying or determining whether a network of the mobility device is reconnected. S819 may be substantially the same as S717.

When the network of the mobility device is reconnected (Yes in S819), the mobility control method according to an embodiment may include returning to S801 to determine whether the route along which the mobility device will operate is set.

When the network of the mobility device is not reconnected (No in S819), in S821, the mobility control method according to an embodiment may include providing the media content. S821 may be substantially the same as S519, S619, and/or S719.

Figure 9:
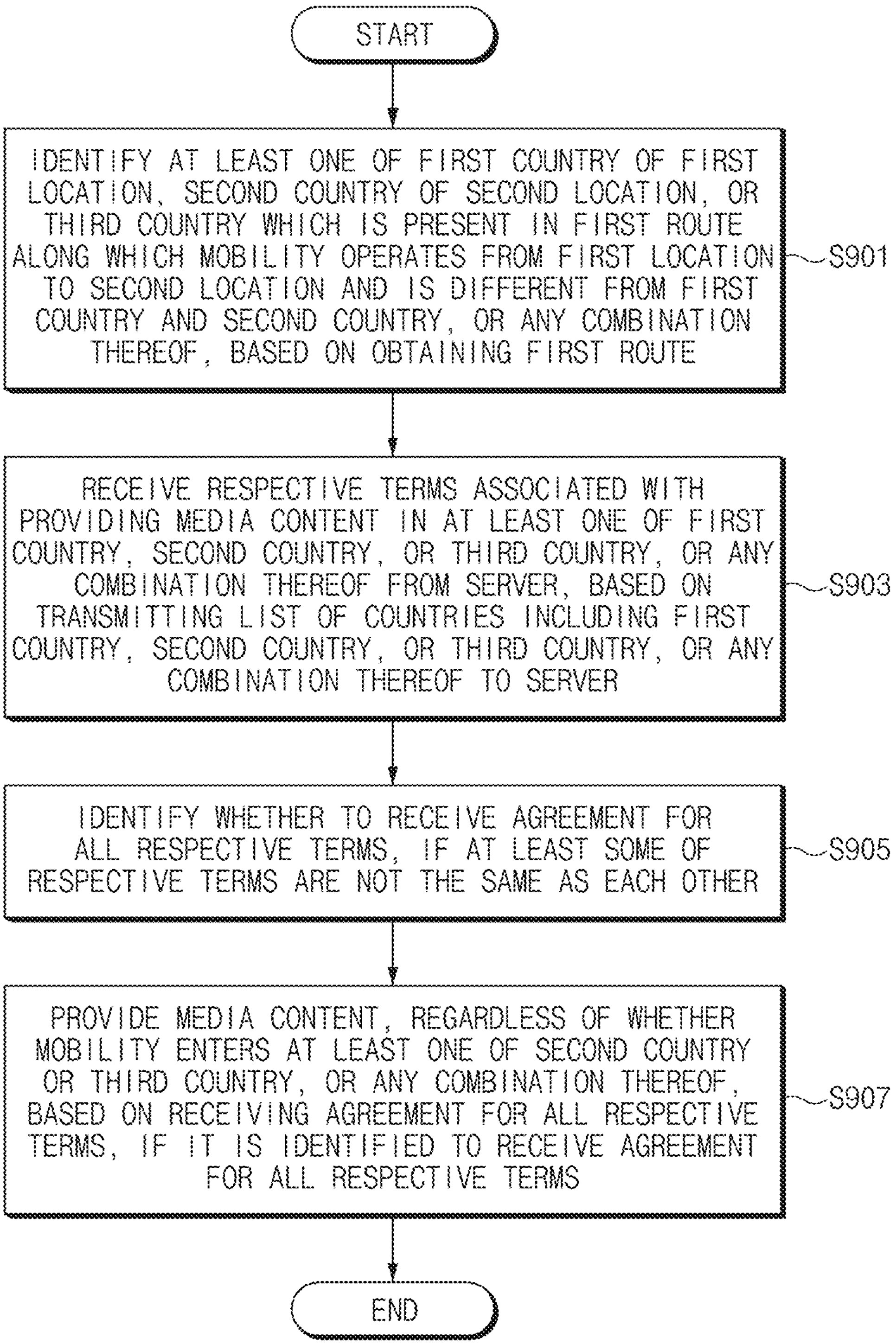
FIG. 9 illustrates an example of a flowchart associated with a mobility control method according to an embodiment of the present disclosure.

FIG. 9 illustrates an example of a flowchart associated with a mobility control method according to an embodiment of the present disclosure.

Hereinafter, it is assumed that a mobility control apparatus 100 of FIG. 1 performs a process of FIG. 9. Furthermore, in the description of FIG. 9, an operation described as being performed by an apparatus may be understood as being controlled by a processor 110 of the mobility control apparatus 100.

At least one of the operations of FIG. 9 may be performed by the mobility control apparatus 100 of FIG. 1. At least one of the operations of FIG. 9 may be controlled by the processor 110 of FIG. 1. The respective operations of FIG. 9 may be sequentially performed but are not necessarily sequentially performed. For example, an order of the respective operations may be changed, and at least two operations may be performed in parallel.

For example, in S901, the mobility control method according to an embodiment may include identifying or determining at least one of a first country of a first location, a second country of a second location, a third country, or any combination thereof, which is present in a first route along which a mobility device operates from the first location to the second location and is different from the first country and the second country, based on obtaining the first route.

In S903, the mobility control method according to an embodiment may include receiving respective terms associated with providing media content in at least one of the first country, the second country, the third country, or any combination thereof from a server, based on transmitting a list of countries including the first country, the second country, the third country, or any combination thereof to the server.

For example, the server may include at least one of a first server for providing the media content in the first country, a second server for providing the media content in the second country, a third server for providing the media content in the third country, or any combination thereof.

For example, the server may include an integrated server for providing the media content in the first country, the second country, and the third country.

In detail, the server may refer to a plurality of servers including the first server, the second server, and the third server or may refer to a single server such as the integrated server.

In S905, the mobility control method according to an embodiment may include identifying or determining whether to receive an agreement for all the respective terms, if at least some of the respective terms are not the same as each other.

For example, the mobility control method may include identifying or determining whether to receive the agreement, before the mobility device initiates to drive, based on whether the mobility device changes to an Ig-on state.

For example, the respective terms may include first terms associated with providing the media content in the first country, second terms associated with providing the media content in the second country, and third terms associated with providing the media content in the third country. The mobility control method may include failing to determine whether to receive the agreement (e.g., the mobility control method may include providing the media content without receiving the agreement), if the second terms and the third terms except for the first terms are the same as each other.

For example, the mobility control method may include providing a user of the mobility device with a screen associated with whether to receive the agreement (i.e., associated with a message requesting user input to indicate whether to receive the agreement), through a display.

For example, the mobility control method may include obtaining an input associated with whether to receive the agreement from the user who receives the message via the screen.

In S907, the mobility control method according to an embodiment may include providing the media content, regardless of whether the mobility device enters at least one of the second country or the third country, or any combination thereof, based on receiving the agreement for all the respective terms, if it is identified or determined to receive the agreement for all the respective terms.

For example, the mobility control method may include providing the media content in only the first country, based on not receiving the agreement for the at least some of the respective terms.

For example, the mobility control method may include providing terms associated with providing the media content in at least one of the second country, the third country, or any combination thereof, through the display, based on the location of the mobility device being within a designated distance from the at least one of the second country, the third country, or any combination thereof, before the mobility device enters the at least one of the second country, the third country, or any combination thereof.

For example, the mobility control method may include identifying or determining whether there is a fourth country different from the first country, the second country, and the third country in a second route different from the first route, based on the first route changing to the second route, while the mobility device is moving from the first location to the second location along the first route.

For example, the mobility control method may include identifying or determining whether respective terms associated with providing the media content in at least one of the first country, the second country, the third country, a fourth country, or any combination thereof are the same as each other, based on the fourth country being in the second route.

For example, the mobility control method may include identifying or determining whether to receive an agreement for fourth terms associated with providing the media content in the fourth country, based on the fourth terms not being the same as the respective terms.

For example, the mobility control method may include providing the media content, regardless of whether the mobility device enters the fourth country, based on receiving the agreement for the fourth terms, if it is identified or determined to receive the agreement for the fourth terms.

For example, the mobility control method may include maintaining providing the media content, if there is no fourth country in the second route.

For example, the mobility control method may include identifying or determining whether to obtain a third route along which the mobility device operates from a third location different from the first location to the second location, based on the state of the mobility device changing from Ig-on state to the state different from the Ig-on state and changes from the different state to the Ig-on state or that a connection of a network between the mobility device and the server being released and reconnected, while the mobility device is moving from the first location to the second location along the first route.

For example, the mobility control method may include identifying or determining whether there is a fifth country different from the first country, the second country, and the third country in the third route.

For example, the mobility control method may include identifying or determining whether fifth terms associated with providing the media content in the fifth country are the same as the respective terms, based on whether there is the fifth country (i.e., based on there being the fifth country).

For example, the mobility control method may include identifying or determining whether to receive an agreement for the fifth terms, if the fifth terms are not the same as the respective terms (i.e., based on whether the fifth terms are the same or not as the respective terms of the other countries).

For example, the mobility control method may include providing the media content, regardless of whether the mobility device enters the fifth country, based on receiving the agreement for the fifth terms, if it is identified or determined to receive the agreement for the fifth terms.

Figure 10:
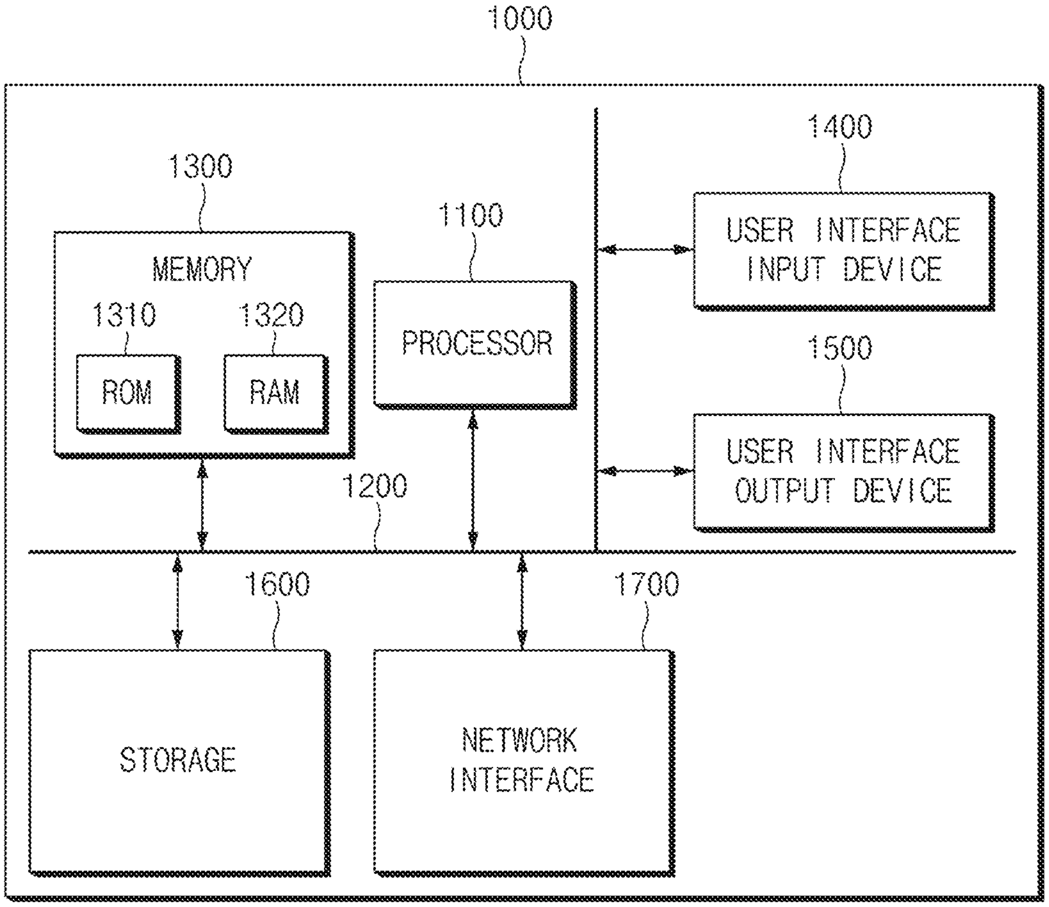
FIG. 10 illustrates a computing system associated with a mobility control apparatus or a mobility control method according to an embodiment of the present disclosure.

FIG. 10 illustrates a computing system associated with a mobility control apparatus or a mobility control method according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the present disclosure may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may previously receive agreement for terms associated with providing media content, before a mobility device initiates to drive, using a route along which the mobility device will operate.

Furthermore, the present technology may seamlessly provide the media content, while the mobility device is moving, if a country where the mobility device initiates to operate and a country where the operation of the mobility device will end are different from each other.

In addition, various effects ascertained directly or indirectly through the present disclosure may be provided.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the embodiments disclosed in the present disclosure is not intended to limit the technical idea of the present disclosure and is intended to describe the technical idea of the present disclosure. The scope of the present disclosure is not limited by the embodiments. The scope of the present disclosure should be construed based on the accompanying claims, and all the technical ideas within the scope equivalent to the claims should be interpreted as being included in the claims of the present disclosure.

What is claimed is:

1. A mobility control apparatus, comprising:

a communication circuit; and a processor configured to:

determine at least one of a first country of a first location, a second country of a second location, a third country different from the first country and the second country, or any combination thereof, in a first route along which a mobility device moves from the first location to the second location based on obtaining the first route;

receive respective terms associated with providing media content in at least one of the first country, the second country, the third country, or any combination thereof from a server, based on transmitting a list of countries including the at least one of the first country, the second country, the third country, or any combination thereof to the server;

determine whether to receive an agreement for all the respective terms, based on at least some of the respective terms not being the same as each other; and provide the media content, regardless of whether the mobility device enters at least one of the second country, the third country, or any combination thereof, based on receiving the agreement for all the respective terms.

2. The mobility control apparatus of claim 1, wherein the respective terms include:

first terms associated with providing the media content in the first country;

second terms associated with providing the media content in the second country; and third terms associated with providing the media content in the third country, wherein the processor is further configured to:

provide the media content without receiving the agreement, based on the second terms and the third terms except for the first terms being the same as each other.

3. The mobility control apparatus of claim 1, wherein the processor is configured to:

provide the media content in only the first country, based on not receiving an agreement for the at least some of the respective terms.

4. The mobility control apparatus of claim 3, further comprising:

a display, wherein the processor is configured to:

provide terms associated with providing the media content in the at least one of the second country, the third country, or the any combination thereof, through the display, based on a location of the mobility device being within a designated distance from the at least one of the second country, the third country, or the any combination thereof, before the mobility device enters the at least one of the second country, the third country, or the any combination thereof.

5. The mobility control apparatus of claim 1, wherein the processor is configured to:

determine whether there is a fourth country different from the first country, the second country, and the third country in a second route different from the first route, based on the first route changing to the second route, while the mobility device is moving from the first location to the second location along the first route.

6. The mobility control apparatus of claim 5, wherein the processor is configured to:

determine whether respective terms associated with providing the media content in at least one of the first country, the second country, the third country, the fourth country, or any combination thereof are the same as each other, based on the fourth country being in the second route;

determine whether to receive an agreement for fourth terms associated with providing the media content in the fourth country, based on the fourth terms not being the same as the respective terms; and provide the media content, regardless of whether the mobility device enters the fourth country, based on receiving the agreement for the fourth terms.

7. The mobility control apparatus of claim 6, wherein the processor is configured to:

maintain providing the media content, when the fourth country is not in the second route.

8. The mobility control apparatus of claim 1, wherein the processor is configured to:

determine whether to obtain a third route along which the mobility device moves from a third location different from the first location to the second location, based on a state of the mobility device changing from ignition (Ig)-on state to a state different from the Ig-on state and changes from the different state to the Ig-on state or a connection of a network between the mobility device and the server being released and reconnected, while the mobility device is moving from the first location to the second location along the first route;

determine whether there is a fifth country different from the first country, the second country, and the third country in the third route;

determine whether fifth terms associated with providing the media content in the fifth country are the same as the respective terms, based on there being the fifth country;

determine whether to receive an agreement for the fifth terms, based on the fifth terms not being the same as the respective terms; and provide the media content, regardless of whether the mobility device enters the fifth country, based on receiving the agreement for the fifth terms.

9. The mobility control apparatus of claim 1, further comprising:

a display, wherein the processor is configured to:

provide a user of the mobility device with a screen associated with a request message indicating whether to receive the agreement, through the display; and obtain an input associated with whether to receive the agreement from the user who receives the request message via the screen.

10. The mobility control apparatus of claim 1, wherein the server includes:

at least one of a first server for providing media content in the first country, a second server for providing the media content in the second country, a third server for providing the media content in the third country, or any combination thereof; or an integrated server for providing the media content in the first country, the second country, and the third country.

11. The mobility control apparatus of claim 1, wherein the processor is configured to:

determine whether to receive the agreement, before the mobility device initiates to drive, based on the mobility device changing to an Ig-on state.

12. A mobility control system, comprising:

a server; and a mobility control apparatus configured to:

determine whether a plurality of countries is included in a first route along which a mobility device moves from a first location to a second location, based on obtaining the first route;

receive respective terms associated with providing media content in the plurality of countries from the server, based on the plurality of countries being included in the first route; and transmit a list of countries including the plurality of countries to the server, based on determining to receive an agreement for the respective terms, and wherein the server is configured to:

transmit the respective terms associated with providing the media content in the plurality of countries included in the list to the mobility control apparatus, based on receiving the list; and provide the media content by the mobility control apparatus, based on receiving information indicating an agreement on the respective terms from the mobility control apparatus.

13. The mobility control system of claim 12, wherein the server is configured to:

include a plurality of terms associated with providing the media content in all countries including the plurality of countries; and transmit the respective terms corresponding to the plurality of terms among the plurality of terms to the mobility control apparatus, based on determining the respective terms.

14. A mobility control method, comprising:

determining, by a processor, at least one of a first country of a first location, a second country of a second location, a third country different from the first country and the second country, or any combination thereof, in a first route along which a mobility device moves from the first location to the second location based on obtaining the first route;

receiving, by the processor, respective terms associated with providing media content in at least one of the first country, the second country, the third country, or any combination thereof from a server, based on transmitting a list of countries including the at least one of the first country, the second country, the third country, or the any combination thereof to the server;

determining, by the processor, whether to receive an agreement for all the respective terms, based on at least some of the respective terms not being the same as each other; and providing, by the processor, the media content, regardless of whether the mobility device enters at least one of the second country, the third country, or any combination thereof, based on receiving the agreement for all the respective terms.

15. The mobility control method of claim 14, wherein the respective terms include:

first terms associated with providing the media content in the first country;

second terms associated with providing the media content in the second country; and third terms associated with providing the media content in the third country, wherein the method further comprises:

providing the media content without receiving the agreement, based on the second terms and the third terms except for the first terms being the same as each other.

16. The mobility control method of claim 14, further comprising:

providing the media content in only the first country, based on not receiving an agreement for the at least some of the respective terms.

17. The mobility control method of claim 16, further comprising:

providing terms associated with providing the media content in the at least one of the second country, the third country, or the any combination thereof, through a display, based on a location of the mobility device being within a designated distance from the at least one of the second country, the third country, or the any combination thereof, before the mobility device enters the at least one of the second country, the third country, or the any combination thereof.

18. The mobility control method of claim 14, further comprising:

determining whether there is a fourth country different from the first country, the second country, and the third country in a second route different from the first route, based on the first route changing to the second route, while the mobility device is moving from the first location to the second location along the first route.

19. The mobility control method of claim 18, further comprising:

determining whether respective terms associated with providing the media content in at least one of the first country, the second country, the third country, the fourth country, or any combination thereof are the same as each other, based on the fourth country being in the second route;

determining whether to receive an agreement for fourth terms associated with providing the media content in the fourth country, based on the fourth terms not being the same as the respective terms; and providing the media content, regardless of whether the mobility device enters the fourth country, based on receiving the agreement for the fourth terms.

20. The mobility control method of claim 19, further comprising:

maintaining providing the media content, when the fourth country is not in the second route.

* * * * *